United States Patent
Xu et al.

(10) Patent No.: US 7,756,518 B2
(45) Date of Patent: Jul. 13, 2010

(54) METHOD AND SYSTEM FOR MINIMIZING CALL SETUP DELAY FOR CALLS OCCURRING IN ONE OR MORE WIRELESS NETWORKS

(75) Inventors: Jianming Xu, Plano, TX (US); Ghassan Naim, Garland, TX (US); Mike Agular, Richardson, TX (US); Pardeep Kohli, Plano, TX (US); Chao-Yee Kuan, Plano, TX (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 160 days.

(21) Appl. No.: 10/531,527

(22) PCT Filed: Oct. 15, 2003

(86) PCT No.: PCT/US03/32836

§ 371 (c)(1),
(2), (4) Date: Apr. 15, 2005

(87) PCT Pub. No.: WO2004/036769

PCT Pub. Date: Apr. 29, 2004

(65) Prior Publication Data

US 2006/0052110 A1 Mar. 9, 2006

Related U.S. Application Data

(60) Provisional application No. 60/418,692, filed on Oct. 15, 2002.

(51) Int. Cl.
*H04W 40/00* (2009.01)

(52) U.S. Cl. .................. 455/445; 455/433; 455/432.1; 455/552.1; 455/41.2; 370/338; 370/352; 379/221.13

(58) Field of Classification Search .................. 455/445, 455/433, 432.3, 432.1, 435.1, 435.2, 436, 455/432.5; 379/221.13; 370/352–356
See application file for complete search history.

(56) References Cited

U.S. PATENT DOCUMENTS

| 5,307,400 | A | * | 4/1994 | Sawyer et al. ............ 455/456.1 |
| 5,878,347 | A | * | 3/1999 | Joensuu et al. ............ 455/433 |
| 5,884,179 | A | * | 3/1999 | Patel ......................... 455/445 |
| 5,953,663 | A | * | 9/1999 | Maupin et al. ............ 455/433 |
| 6,049,714 | A | * | 4/2000 | Patel ......................... 455/433 |
| 6,058,313 | A | * | 5/2000 | Slutsman et al. .......... 455/445 |
| 6,064,887 | A | * | 5/2000 | Kallioniemi et al. ...... 455/445 |

(Continued)

*Primary Examiner*—Sharad Rampuria
(74) *Attorney, Agent, or Firm*—RG & Associates (57) ABSTRACT

Provided is a method and system for minimizing call setup delay in a network. The system includes a central node that may be connected to multiple home location registers (HLRs) and a number portability database (NPDB). The central node may also be associated with two tables. The first table includes mobile station identifiers and associated location routing numbers (LRNs), and the second table includes mobile station identifiers and associated home location registers (HLRs). The method searches the first and second tables for a mobile station identifier that matches a mobile station identifier associated with a call. If a match is found, the method uses the associated LRN or HLR to continue with the call setup or to obtain further information. If no match is found, the method sends a query to the NPDB. The method may also dynamically update the first and second tables as current information is obtained.

10 Claims, 10 Drawing Sheets

U.S. PATENT DOCUMENTS

| | | | |
|---|---|---|---|
| 6,138,023 A * | 10/2000 | Agarwal et al. | 455/445 |
| 6,161,017 A | 12/2000 | Britt et al. | |
| 6,192,242 B1 * | 2/2001 | Rollender | 455/433 |
| 6,226,517 B1 * | 5/2001 | Britt et al. | 455/445 |
| 6,240,293 B1 * | 5/2001 | Koster | 455/445 |
| 6,347,085 B2 * | 2/2002 | Kelly | 370/352 |
| 6,366,663 B1 * | 4/2002 | Bauer et al. | 379/221.13 |
| 6,564,055 B1 * | 5/2003 | Hronek | 455/433 |
| 6,574,481 B1 * | 6/2003 | Rathnasabapathy et al. | 455/461 |
| 6,625,273 B1 * | 9/2003 | Ashdown et al. | 379/221.13 |
| 6,662,017 B2 * | 12/2003 | McCann et al. | 455/461 |
| 6,678,265 B1 * | 1/2004 | Kung et al. | 370/352 |
| 6,725,044 B2 * | 4/2004 | Verma et al. | 455/444 |
| 6,819,921 B2 * | 11/2004 | Mazzarella et al. | 455/419 |
| 6,839,421 B2 * | 1/2005 | Ferraro Esparza et al. | 379/220.01 |
| 7,079,511 B2 * | 7/2006 | Abrol et al. | 370/331 |
| 7,502,615 B2 * | 3/2009 | Wilhoite et al. | 455/442 |
| 7,577,431 B2 * | 8/2009 | Jiang | 455/432.1 |
| 7,664,495 B1 * | 2/2010 | Bonner et al. | 455/433 |
| 2002/0052211 A1 * | 5/2002 | Kim et al. | 455/461 |
| 2002/0147008 A1 * | 10/2002 | Kallio | 455/426 |
| 2003/0054809 A1 * | 3/2003 | Bridges et al. | 455/419 |
| 2003/0199281 A1 * | 10/2003 | Rathnasabapathy et al. | 455/461 |
| 2005/0261021 A1 * | 11/2005 | Hallenstal et al. | 455/552.1 |
| 2006/0099935 A1 * | 5/2006 | Gallagher et al. | 455/414.1 |
| 2006/0276226 A1 * | 12/2006 | Jiang | 455/558 |

\* cited by examiner

Fig. 10

METHOD AND SYSTEM FOR MINIMIZING CALL SETUP DELAY FOR CALLS OCCURRING IN ONE OR MORE WIRELESS NETWORKS

CROSS-REFERENCE

This patent application claims priority from U.S. Provisional Patent Application Ser. No. 60/418,692, filed on Oct. 15, 2002. This application is also related to International Patent Application Serial Number PCT/US03/03742, filed on Feb. 2, 2003.

BACKGROUND

The present disclosure relates generally to voice and data communications and, more particularly, to a wireless system and method for minimizing call setup delay for a mobile call occurring across one or more wireless networks.

With the ever-evolving technology in the wireless industry, new wireless generations are being standardized to provide new and broader set of wireless services to end-users. With this natural evolution, the definition and deployment of new network architectures and technologies leads to a coexistence of multiple wireless networks. These networks may be based on different technologies, and some networks may have the capability to support more services than others. In general, older networks may be unable to provide the same features or support the same capacity as may be provided by newer networks.

Within this changing environment, a subscriber in a given network may decide to change his subscription to another network based on a different technology. Such a change may be based on any number of reasons, such as to gain access to new service features, better service quality, or a wider coverage area at the national and international level. However, problems may arise when changing a subscription to another network based on a different technology. For example, the subscriber may be assigned a new mobile phone number that may be registered in the new network, and may lose his previous number, making it difficult for people who have the original number to reach the subscriber. Mobile number portability is a concept used in wireless systems to resolve the above problem and to maintain the association of the original number with the subscriber after the subscriber changes subscriptions to a different network owned by the same network operator but based on a different technology. While operating both an older network and a new network, one of the concerns for a network operator is how to efficiently introduce mobile number portability (MNP) and support calls across different network technologies without changing service quality and without introducing relatively drastic changes to their existing network architecture and infrastructure.

Accordingly, what is needed is a method and system to minimize call setup delay in a telecommunications environment. It is desired to accomplish this while reducing the number of queries to a number portability database server, thereby reducing the service cost associated with such queries. It is also desired to minimize messaging between network entities. In addition, it is desired to avoid degradation in the quality and reliability of services provided to subscribers, and to accomplish this without introducing drastic changes to existing networks and their network entities.

SUMMARY

In one embodiment, a method for minimizing call setup delay for a call in a communication network is provided, wherein the communication network includes a central node connected to a number portability database. The method comprises triggering a first query to the central node for information for routing the call when a request for setting up the call is received by a switching unit. A second query is triggered from the central node to a home location register for the routing information in order to set up the call, and a third query from the central node to the number portability database for the routing information is triggered if the second query fails to provide the routing information.

In another embodiment, a method for minimizing call setup delay in a telecommunications network is provided. The network includes first and second tables, wherein the first table contains a plurality of identifiers and an associated location routing number (LRN) for each identifier, and the second table contains a plurality of identifiers and an associated home location register (HLR) for each identifier. The method comprises determining whether an identifier associated with a mobile device is listed in the first table and sending a query to a network node corresponding to the LRN associated with the identifier if the identifier is listed in the first table. If the identifier is not listed in the first table, the method determines whether the identifier is listed in the second table. If the identifier is listed in the second table, a query is sent to the HLR associated with the identifier.

In yet another embodiment, a telecommunications system adapted for minimizing call setup delay for a call associated with a first mobile station identifier is provided. The system comprises a plurality of home location registers (HLRs), a central node in communication with the HLRs, and first and second tables accessible to the central node. The first table contains a plurality of mobile station identifiers and associated location routing numbers, and the second table contains a plurality of mobile station identifiers, wherein each identifier is associated with one of the HLRs. The system also includes instructions adapted for execution by the central node. The instructions include instructions for searching the first table for a mobile station identifier that matches the first mobile station identifier and sending a query to a network entity identified by the associated location routing number if a match is found, and instructions for searching the second table for a mobile station identifier that matches the first mobile station identifier and sending a query to the associated HLR if a match is found.

WRITTEN DESCRIPTION

The present disclosure relates generally to voice and data communications and, more particularly, to a wireless system and method for minimizing call setup delay for a mobile call occurring across one or more wireless networks. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. For ease of reference, various acronyms are used are used in the present disclosure, the definitions of which are listed below:

ANM ANswer Message

ANSI-41 American National Standards Institute—Cellular Radio Telecommunications Intersystem Operations BSS Base Station System DN Dialed Number GMSC Gateway MSC GSM Global System for Mobile communications HLR Home Location Register LAM Initial Address Message IS41 Wireless Network conforming to the IS41 standard ISDN Integrated Services Digital Network ISUP ISDN User Part (of SS7)

LocReqLocation Request

LocReqResp Location Request Response

LRN Location Routing Number

MC Message Center

MSC Mobile Switching Center

MSISDN Mobile Station ISDN Number

MSRN Mobile Switching Routing Number

MTX Mobile Telephone Exchange—A term used to describe a large exchange used within a cellular mobile system and connected to a PSTN.

PRN Provide Routing Number

PRNResp PRN Response

PSTN Public Switch Telephone Network

SMS Short Message Service

SMSC Short Message Service Centre

SRI Send Routing Information

SRIResp SRI Response

SS7 Signaling System No. 7

T1 Digital communication line that uses time division multiplexing with an overall transmission rate of 1.544 million bits per second.

UMTS Universal Mobile Telecommunications System

USSD Unstructured Supplementary Service Data

Figure 1:
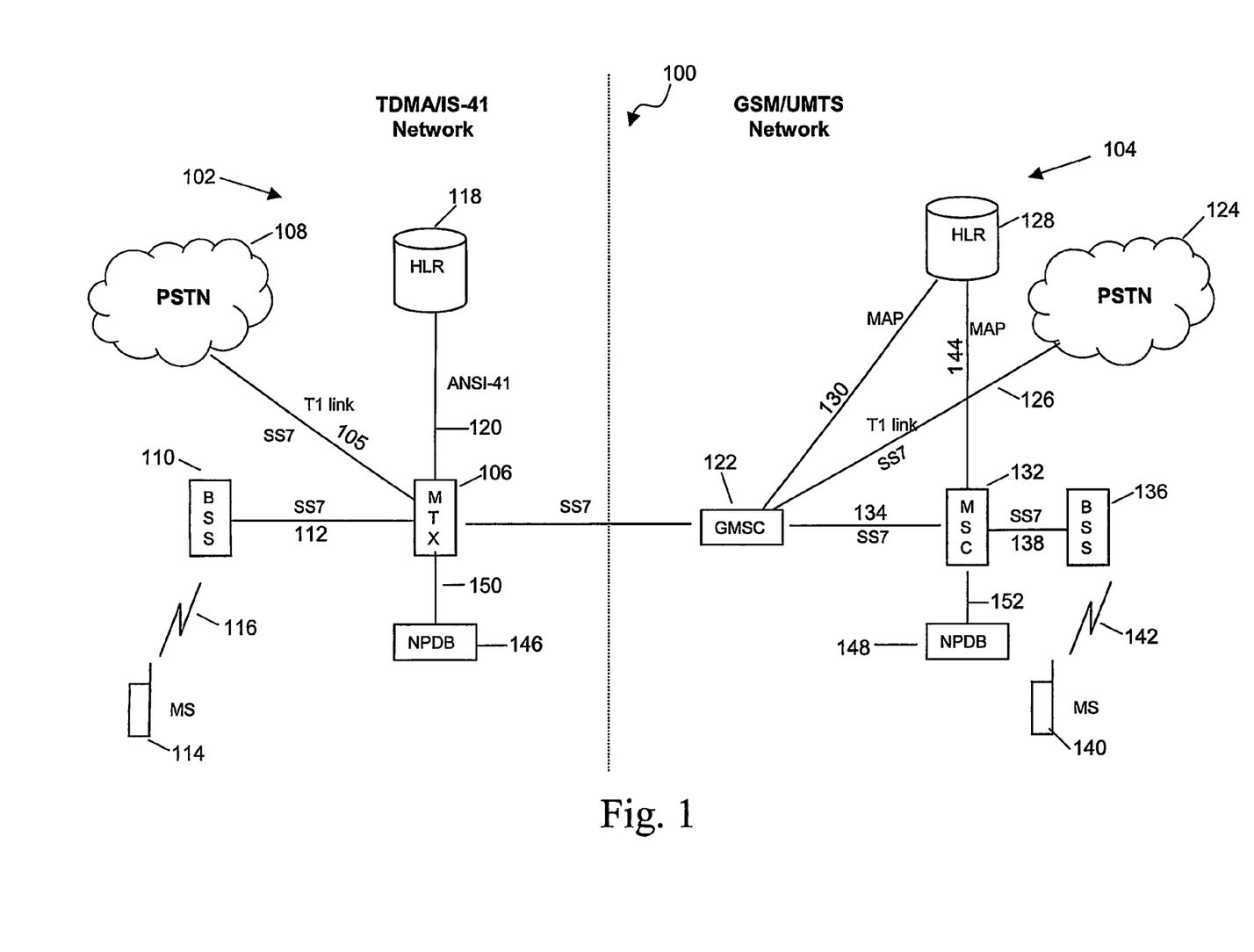
FIG. 1 illustrates an exemplary network architecture for providing mobile number portability between a TDMA/IS-41 and a GSM UMTS network.

Referring to FIG. 1, a network architecture 100 is illustrated for a current solution for providing mobile number portability service in two communication networks based on two different generations of network technologies. The two networks illustrated are an IS41/TDMA network 102 and a GSM/UMTS network 104. It is noted that a variety of protocols may be utilized to enable communications to occur through various network components. For example, some communications may use Signaling System 7 Integrated Services Digital Network (ISDN) User Part (known collectively as "SS7 ISUP") or Internet Protocol (IP), while others may utilize GPRS Tunneling Protocol U (GTP-U) for user data and GTP-C for signaling.

A T1 communications link 105 connects a mobile telephone exchange ("MTX") 106 in the TDMA network 102 to a Public Switched Telephone Network ("PSTN") 108 using an SS7 protocol. As is well known in the art, the MIX 106 is in communication with a BSS 110 via a link 112 which also uses the SS7 protocol. The BSS 110 may communicate with a number of mobile stations, such as mobile station 114, through a radio link 116. The MTX 106 is also in communication with a Home Location Register ("HLR") 118 via a communications link 120 using an IS-41 protocol. The MTX 106 also communicates with a Gateway Mobile Switching Center ("GMSC") 122 over a communications link 124 using the SS7 protocol.

A GMSC 122 is part of the GSM network 104. The GMSC 122 is in communication with a PSTN 124 (which could be identical to the PSTN 108) via a T1 link 126 using the SS7 protocol. The GMSC 122 is in communication with an HLR 128 via a communications link 130 using a MAP protocol. The GMSC 122 is also in communication with a Mobile Switching Center ("MSC") 132 via a link 134 using the SS7 protocol. The MSC 132 is in communication with a BSS 136 via a communications link 138 using the SS7 protocol. The BSS 136 may be in communication with a number of mobile stations, such as mobile station 140 via a radio link 142. In this example, the MSC 132 is also in communication with the HLR 128 via a communications link 144 using the MAP protocol.

Figure 2:
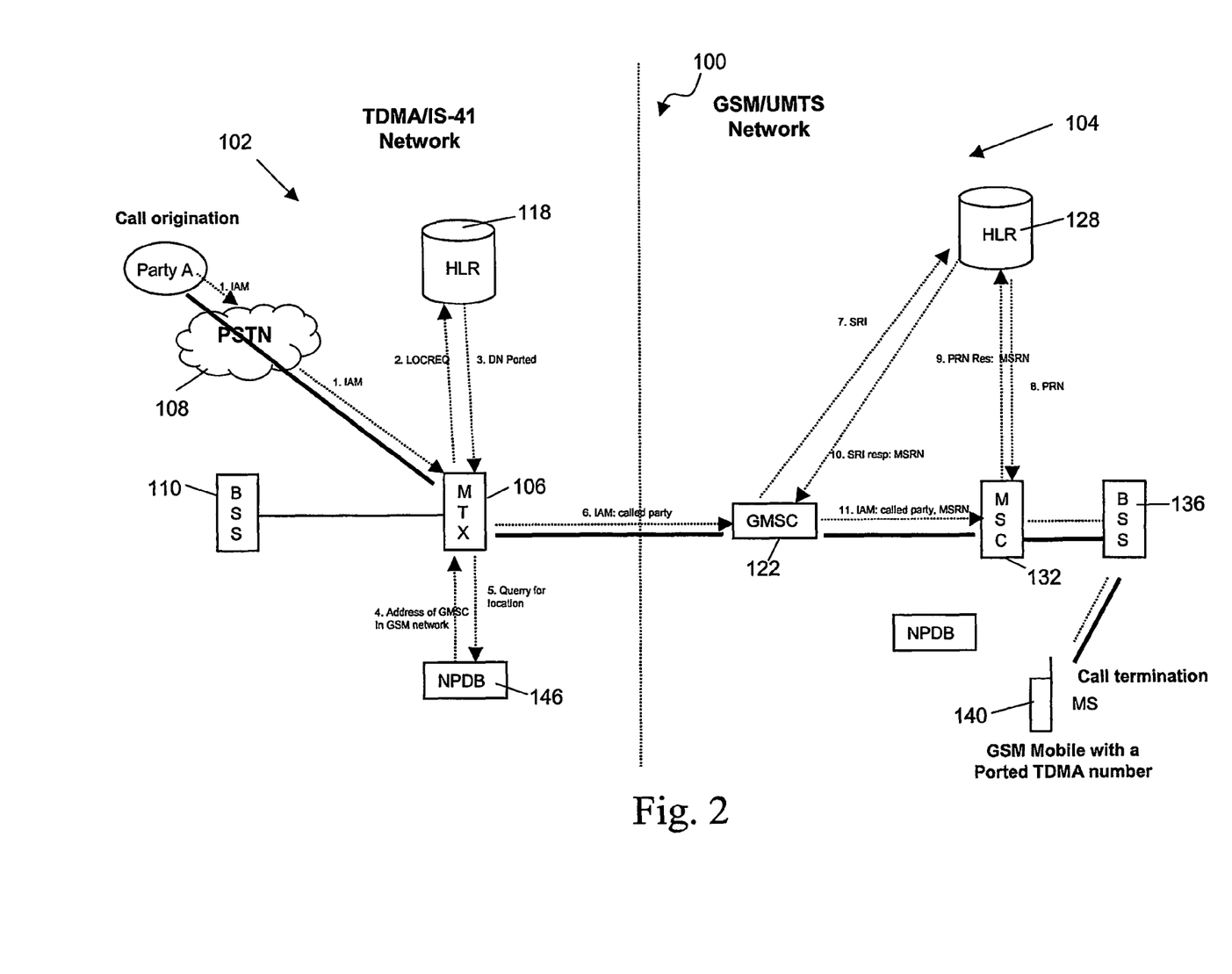
FIG. 2 illustrates an exemplary service operation using number portability within the network architecture of FIG. 1 where a PSTN number is dialing a GSM mobile that has a TDMA ported number.

In this illustration, each network has a Number Portability DataBase ("NPDB") 146 and 148 respectively, where all the mobiles with ported numbers are registered. The NPDB 146 of the TDMA network 102 is in communication with the MTX 106 via a communications link 150. Similarly, the NPDB 148 of the GSM network 104 is in communication with the MSC 132 via a communications link 152. A ported mobile number is a mobile number that is no longer subscribed to a first (original) network, but has been moved (subscribed) to a second (new) network. The new network may belong to the same network operator as the original network, but may be based on a different technology. Alternatively, the new network may belong to a different network operator, and may be based on either the same technology or a different technology than the original network. For example, the NPDB 146 in the TDMA network 102 contains a list of mobile numbers which used to be TDMA subscribers and have now become GSM subscribers. These subscribers, however, are registered with the mobile phone number used in the TDMA network 102. Similarly, the NPDB 148 of the GSM network 104 contains a list of mobile numbers that used to be GSM subscribers, but have now become TDMA subscribers. Referring now to FIG. 2, an exemplary operation is illustrated where a caller ("Party A") from the PSTN 108 calls the mobile 140 (which has a ported number from the TDMA network 102) in the GSM network 104. In step 1, the PSTN caller Party A sends an Initial Address Message (IAM) to the PSTN network 108, which forwards the IAM to the MTX 106 in the TDMA network 102. Given that the mobile number has not changed after moving its subscription to the GSM network 104, any incoming calls from the PSTN 108 will be routed to the MTX 106 located in the TDMA network 102.

In step 2, the MTX 106 will query the HLR 118 for routing information by sending a Request, such as a Location Request (LocReq) message, to the HLR 118. In response, the HLR 118 in step 3 sends a Location Request Response (LocReqResp) message to the MTX 106 indicating that the dialed number is a ported number to another network. The MTX 106 then sends a Query for Location message in step 4 to the NPDB 146 requesting the location and identity of a Gateway MSC (GMSC) that is serving the mobile 140 in the new network. In step 5, the NPDB 146 sends the address of the GMSC in the new GSM network (e.g., GMSC 122) to the MTX 106. The MTX 106 then forwards the IAM message to the GMSC 122 in step 6. The GMSC 122 receives the LAM message, but the IAM message contains no routing information to indicate which MSC should receive the call. As is known in the art, this routing information may be stored and maintained at the HLR 128.

In step 7, the GMSC 122 sends a Send Routing Information (SRI) message to the HLR 128 requesting the routing number and address of the MSC serving the mobile 140. In step 8, the HLR 128 sends a Provide Routing Number (PRN) message to the MSC 132, which is serving the mobile 140. The PRN message requests the routing number of the MSC 132. In step 9, the MSC 132 returns a Mobile Switching Routing Number (MSRN) to the HLR 128, which then forwards the routing number to the GMSC 122 in an SRI Response message (step 10). In step 11, the GMSC 122 forwards the LAM message to the MSC 132. At this point, the MSC 132 takes control and contacts the mobile 140 in its serving area via the BSS 136. The MSC 132 connects the mobile 140 with the PSTN calling Party A via the GMSC 122 in the GSM network and the MTX 106 in the TDMA network.

In the above described operation, it can be seen that a total of eleven messages are needed between core network entities in order for the call to reach the MSC serving the mobile 140 in the GSM network 104. In addition, changes and special provisioning to the TDMA HLR 118 may be needed in order to keep track of all the mobile numbers that have moved to another network. For example, this may require insertion of a record noting that the called mobile is no longer a TDMA subscriber and is now a ported number to the GSM network. However, such a record may be an undesirable use of resources at the HLR 118, since network operators may want to remove all records from the HLR 118 for subscribers that are no longer subscribers of the network of that HLR 118.

Figure 3:
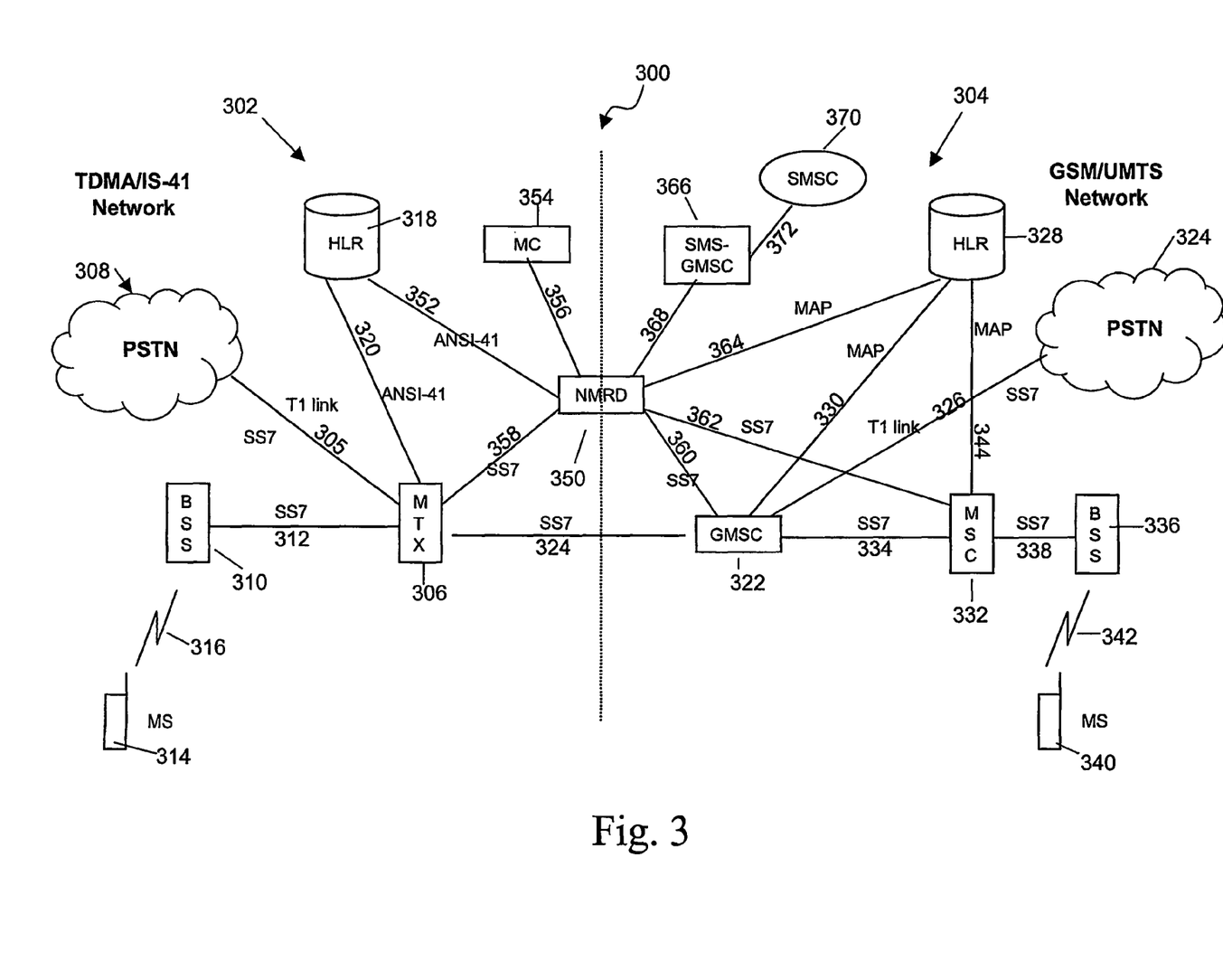
FIG. 3 illustrates a Network Messaging and Routing Device (NMRD) implemented within an exemplary network architecture similar to that of FIG. 1.

Another disadvantage of such operation is that two independent NPDB entities may be needed, one for each network. This may cause a wireless service provider to incur higher operational and maintenance costs and longer deployment time for the number portability service. An additional disadvantage with the above operation is that the GMSC 122 in the GSM network is involved in the call both during the call setup procedure and after the call is setup, which removes a communication port from availability. Similar disadvantages and restrictions may occur in other scenarios, such as when a PSTN user calls a mobile in the TDMA network that has a ported number from the GSM network. Referring now to FIG. 3, an alternative network architecture 300 for mobile number portability is illustrated. The network architecture of FIG. 3 and methods for use therewith are discussed in greater detail in International Patent Application Serial Number PCT/US03/03742, filed on Feb. 2, 2003, entitled "Method and System for Providing Mobile Number Portability Between Different Wireless Networks of Different Technologies," and which is incorporated herein by reference as if reproduced in its entirety. In this illustration, the two networks are an IS41/TDMA network 302 and a GSM/UMTS network 304.

A T1 communications link 305 connects a MTX 306 in the TDMA network 302 to a PSTN 308 using the SS7 protocol. As is well known in the art, the MTX 306 may be in communication with a BSS 310 via a link 312 that also uses the SS7 protocol. The BSS 310 may communicate with a number of mobile stations, such as mobile station 314, through a radio link 316. The MTX 306 is also in communication with a HLR 318 via a communications link 320 using an IS-41 protocol. The MTX 306 communicates with a GMSC 322 over a communications link 324 using the SS7 protocol.

The GMSC 322 is part of the GSM network 304. The GMSC 322 is in communication with a PSTN 324 (which could be identical to the PSTN 308) via a T1 link 326 using the SS7 protocol. The GMSC 322 is in communication with an HLR 328 via a communications link 330 using a MAP protocol. The GMSC 322 is also in communication with a MSC 332 via a link 334 using the SS7 protocol. The MSC 132 may be in communication with a BSS 336 via a communications link 338 using the SS7 protocol. The BSS 336 may be in communication with a number of mobile stations, such as mobile station 340, via a radio link 342. In this example, the MSC 332 is also in communication with the HLR 328 via a communications link 344 using the MAP protocol.

The network architecture illustrated in FIG. 3 introduces a Network Messaging and Routing Device ("NMRD") 350. The NMRD 350 may be configured to communicate with a variety of network elements in both the TDMA network 302 and the GSM network 304 using the appropriate protocols. For instance, on the TDMA network side, the NMRD 350 may communicate with the HLR 318 via a link 352 using the IS-41 protocol. The NMRD 350 may communicate with a message center ("MC") 354 via a link 356 using the IS-41 protocol. The NMRD 350 may also communicate with the MTX 306 via a link 358 using the SS7 protocol.

On the GSM network side, the NMRD 350 may communicate with the GMSC 322 via a communications link 360 using the SS7 protocol. The NMRD 350 may communicate with the MSC 332 via a communications link 362 using the SS7 protocol. The NMRD 350 may communicate with the HLR 328 via a communications link 364 using the MAP protocol. Additionally, the NMRD 350 may be configured to communicate with the short message service gateway mobile switching center ("SMS-GMSC") 366 via a communication link 368. The SMS-GMSC 366 communicates with a short message service center ("SMSC") 370 via a communication link 372 in a manner well known in the art. When used in the above network, the NMRD 350 acts as a TDMA/IS-41 to GSM MAP signaling gateway that translates the signaling messages from one protocol to another protocol (e.g., translates between protocols used in different wireless network technologies). In addition, the NMRD 350 may maintain a database (not shown) that keeps track of all mobile numbers that are ported from one network technology to another.

Figure 4:
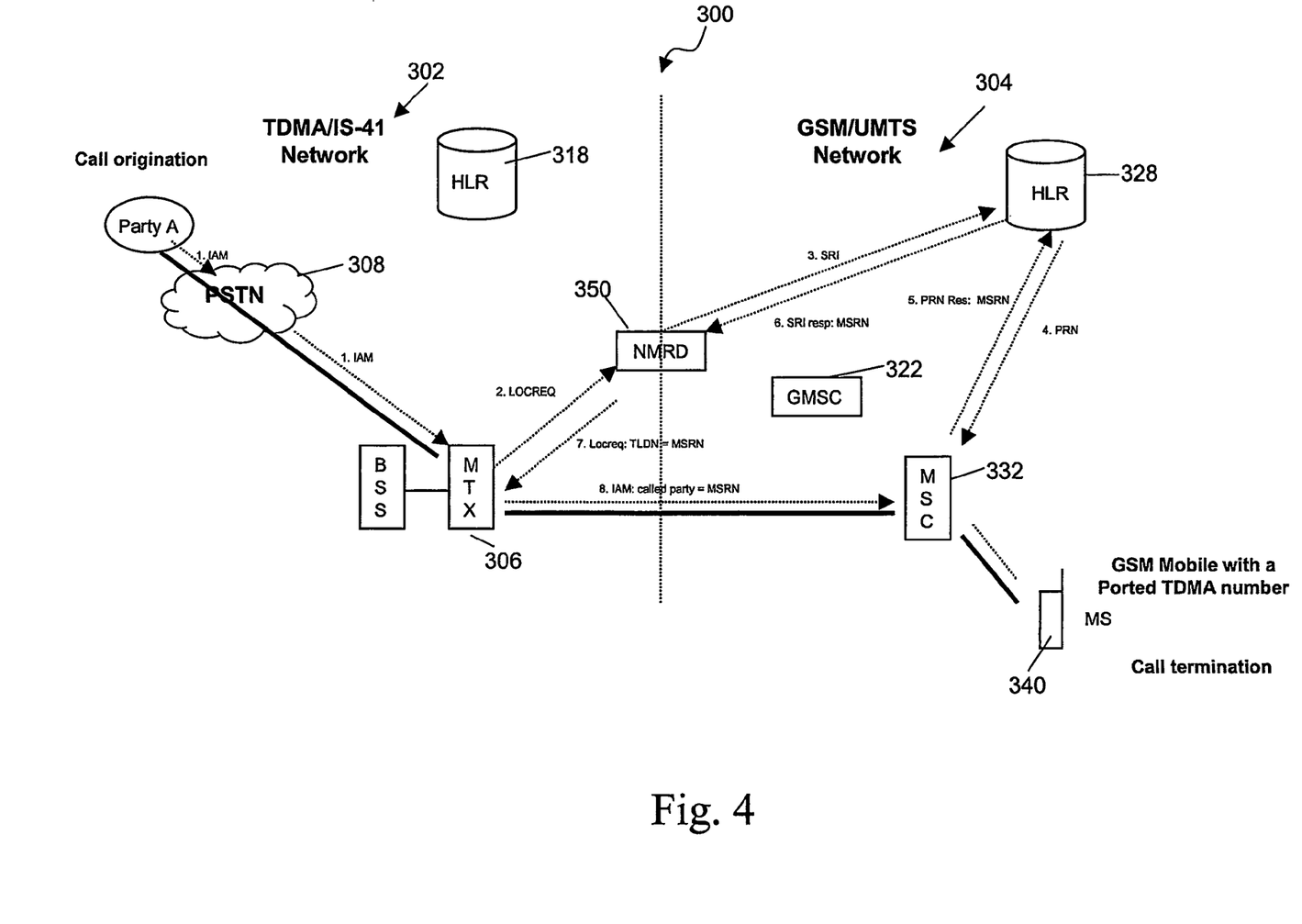
FIG. 4 illustrates an exemplary service operation using number portability within the network architecture of FIG. 3.

Referring now to FIG. 4, an exemplary network operation of the network architecture 300. In this example, a "Party A" from the PSTN 308 is calling the mobile station 340 operating in the GSM network 304 and having a portable number from the TDMA network 302.

In step 1, the PSTN caller Party A sends an initiation message, such as an IAM, to the PSTN 308, which in turn, forwards the message to the MTX 306 in the TDMA network 302. Given that the mobile number has not changed after the user moved the subscription to the GSM network 304, any incoming calls from the PSTN 308 may be routed to the MTX 306 located in the TDMA network 302 in a manner well known in the art. In step 2, the MTX 306 queries the NMRD 350 for routing information by sending a query message, such as LOCREQ message. After accessing the appropriate database, the NMRD 350 may determine that the called number is a mobile that was a TDMA network 302 subscriber, but has become a GSM network 304 subscriber. In an attempt to find which MSC is currently serving the mobile 340 in the GSM network 304, the NMRD 350 queries the HLR 328 in the GSM network 304 in step 3. For instance, the NMRD 350 may send a SRI message to the HLR 328 requesting the routing number and address for the MSC that is currently serving the mobile station 340. In step 4, the HLR 328 sends a PRN message to the MSC 332 asking for its routing number. In step 5, the MSC 332 sends a response, such as a PRN Response containing a MSRN to the HLR 328, which forwards the routing number to the NMRD 350 in a SRI Response message (step 6). In step 7, the NMRD 350 sends a response to the MTX 306, such as a LocReq Response message, which provides the routing information and the address of the MSC 332 in the GSM network 304.

Once the MTX 306 has the routing information, the MTX 306 may forward the IAM message to the MSC 332 in the GSM network 304 (step 8). At this point, the MSC 332 takes control and contacts the mobile 304 in its serving area in a manner well known in the art. The MSC 332 may then connect the mobile station 340 with the PSTN caller Party A via the MTX 306 in the TDMA network 302. In comparison to the operation presented with reference to FIGS. 1 and 2, the above embodiment uses only eight messages between the core network entities, instead of the eleven needed previously. Fewer messages generally leads to a shorter call setup delay. In addition, the above embodiment does not use the HLR 318 in the TDMA network 302 or the GMSC 322 in the GSM network 304 to setup the call. Accordingly, unlike the operation presented in FIGS. 1 and 2, the present embodiment does not require HLR provisioning.

Figure 5:
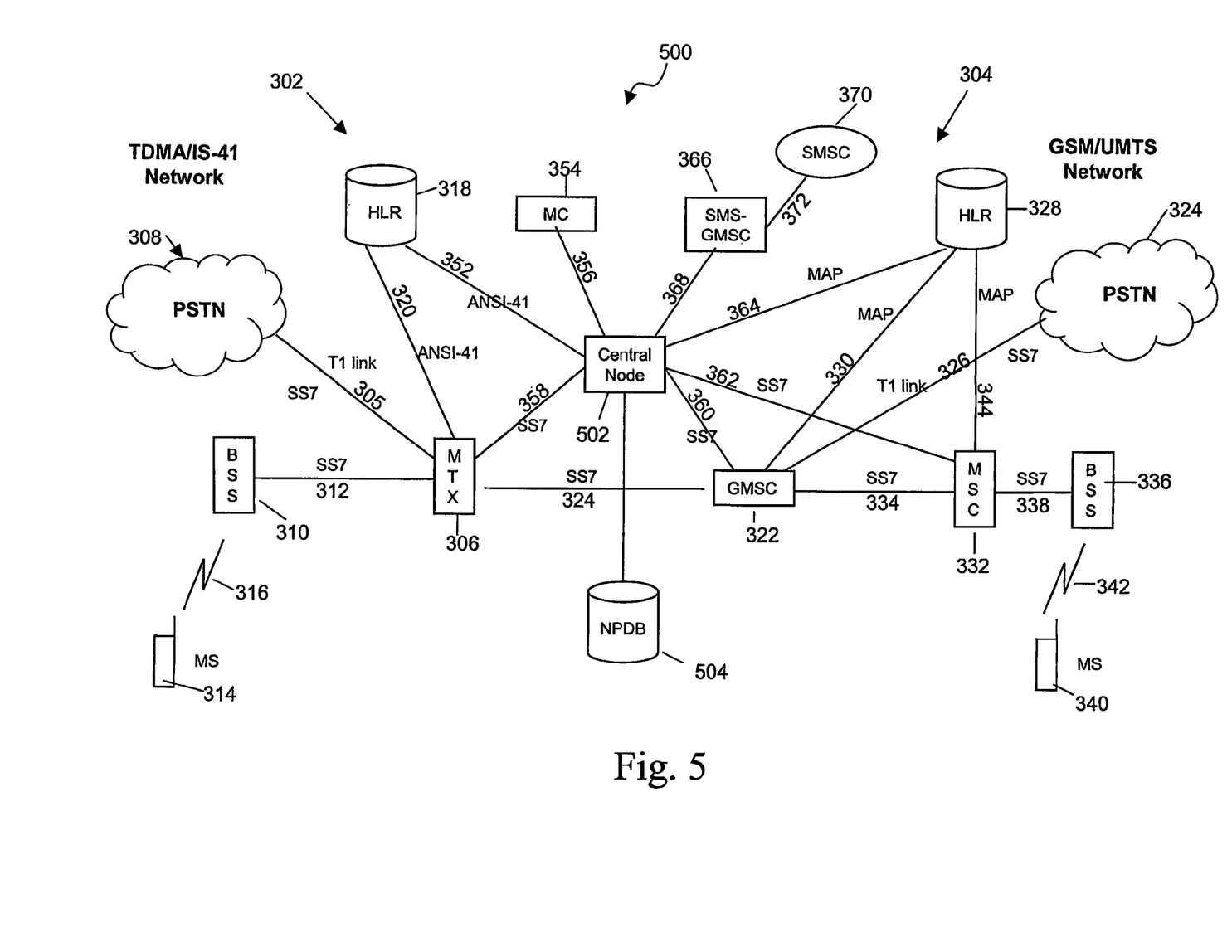
FIG. 5 illustrates the network architecture of FIG. 3 having a number portability database (NPDB) as an independent network entity.

Referring now to FIG. 5, a network architecture 500 illustrates the network architecture 300 of FIG. 3 with a Central Node 502 connected to an NPDB server 504 provided as an independent network entity. Networks supporting mobile number portability that implement such a standalone NPDB server may incur a charge on every query sent to that server.

In the present example, the Central Node 502 (which may be similar or identical to the NMRD 350 of FIG. 3) serves as a network entity that links the TDMA network 302 and the GSM network 304 to provide call services for mobiles operating in both networks. As the network architecture 500 should be able to handle a mobile call regardless of the network technology, all queries arriving at the Central Node 502 need to be handled appropriately so that the call can be forwarded to the network node that will handle the next part of the end-to-end call setup procedure. Accordingly, the Central Node 502 may need the ability to make certain decisions. For example, the Central Node may need to determine which HLR (e.g., the HLR 318 or the HLR 328) to query for mobile information, and to which network the mobile number belongs. Such information needs to be obtained on a per call basis, and it should be obtained relatively quickly to minimize the call setup delay.

To determine which HLR should be queried to obtain the mobile information, one possible solution is for the Central Node to randomly select and query a HLR. If a response message from the selected HLR indicates that the mobile in question is unknown, the Central Node will query the second HLR, which should respond with the mobile information. This solution, however, may increase the call setup delay in cases where multiple HLRs are queried, and also increases traffic on the network, which may lead to congestion as the number of call requests increases.

To determine the network to which the mobile belongs, another possible solution is for the Central Node 502 to query the standalone NPDB server 504 for every call request. The NPDB server's response would include information on the next network entity needed for the call setup procedure. However, this solution is relatively expensive given that each query to the NPDB server 504 may incur a charge to the network operator. In addition, this solution introduces additional call setup delay because of the time needed to query the NPDB server 504 and wait for a response.

In the present example, because the Central Node 502 is connected to the NPDB server 504, all calls arriving at the MTX 306, the MSC 332, and the GMSC 322 may trigger a query to the Central Node 502 for information on routing the call. Depending on the called number, the Central Node 502 may execute a procedure to identify and query the appropriate HLR (e.g., the HLR 318 or the HLR 328) and the NPDB 504, if needed. The Central Node 502 would then reply to the requesting MTX 306, MSC 332, or GMSC 322 with the appropriate call routing information.

To minimize the call setup delay caused by multiple queries by the Central Node 502, two tables may be implemented in the Central Node 502: a LRN_Table and a HLR_Table. As depicted below in Table 1, the LRN_Table presents a mapping between a MSISDN and the corresponding LRN. The LRN may be used with a number translation schema to identify the destination network entity that will handle the next phase in the end-to-end call setup procedure.

| LRN_Table | |
| --- | --- |
| Mobile Number | LRN |

The HLR_Table (Table 2, below) identifies which HLR type (e.g., GSM or TDMA) should be queried for calls related to a given mobile number. The indication of the HLR type is accomplished with the use of a flag set to either "ON" and "OFF" in the appropriate column. For example, when the flag is set to "ON" in the GSM HLR column, the GSM HLR should be queried for mobile information and status.

| HLR_Table | | |
| --- | --- | --- |
| Mobile Number | GSM HLR (flag) | TDMA HLR (flag) |

The LRN_Table and the HLR_Table may be created or populated in real-time and may contain cached information that is updated dynamically based on the response received from the NPDB server 502 and the queried HLR. The LRN_Table and the HLR_Table may originally be empty (e.g., until responses are received by the Central Node 502), or entries may be provisioned for mobile numbers for which the mapping to a LRN and HLR type is known. As more responses are received by the Central Node 502, new entries may be dynamically added to the LRN_Table and the HLR_Table.

Figure 6:
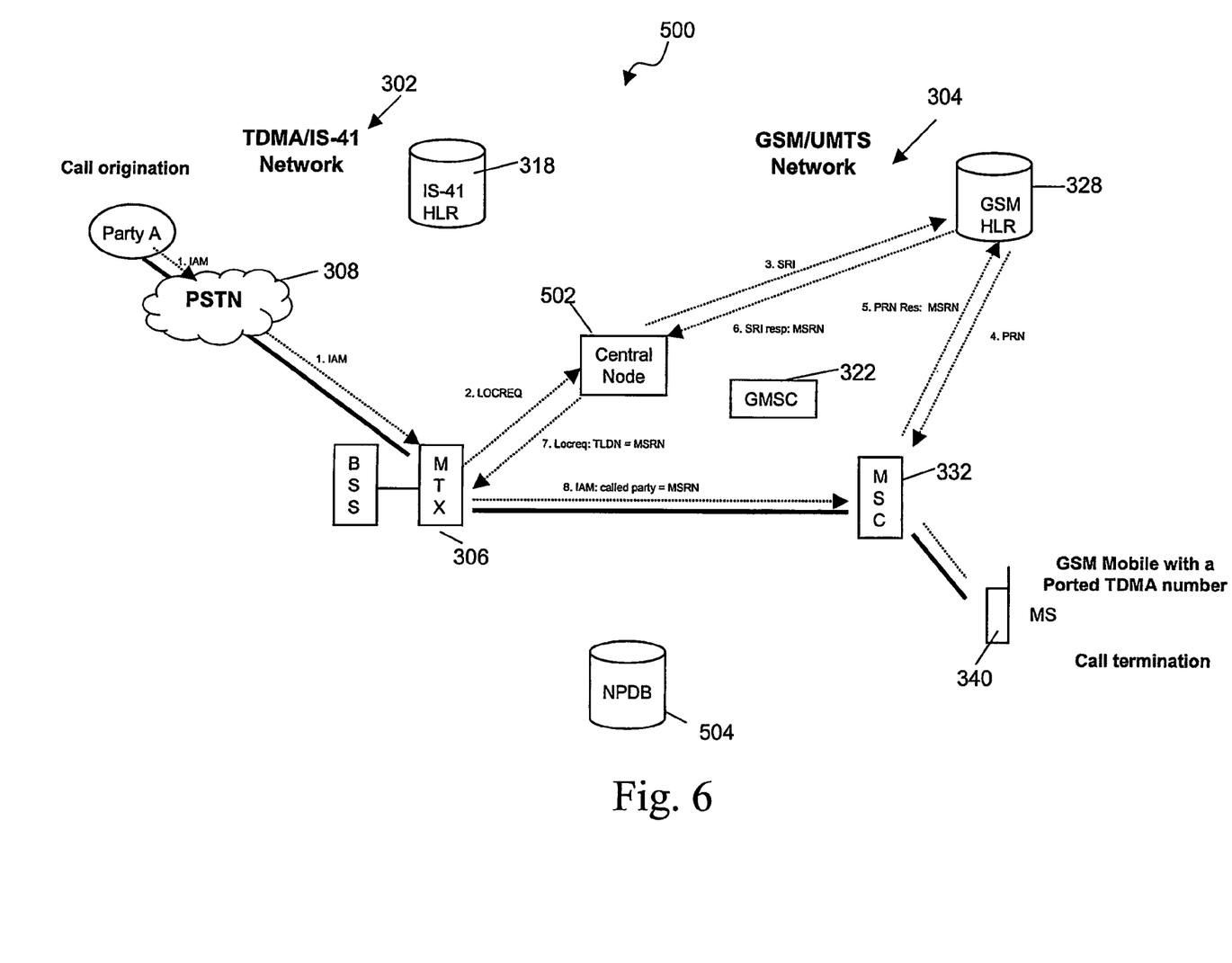
FIG. 6 illustrates an exemplary service operation using number portability within the network architecture of FIG. 5.
Figure 7:
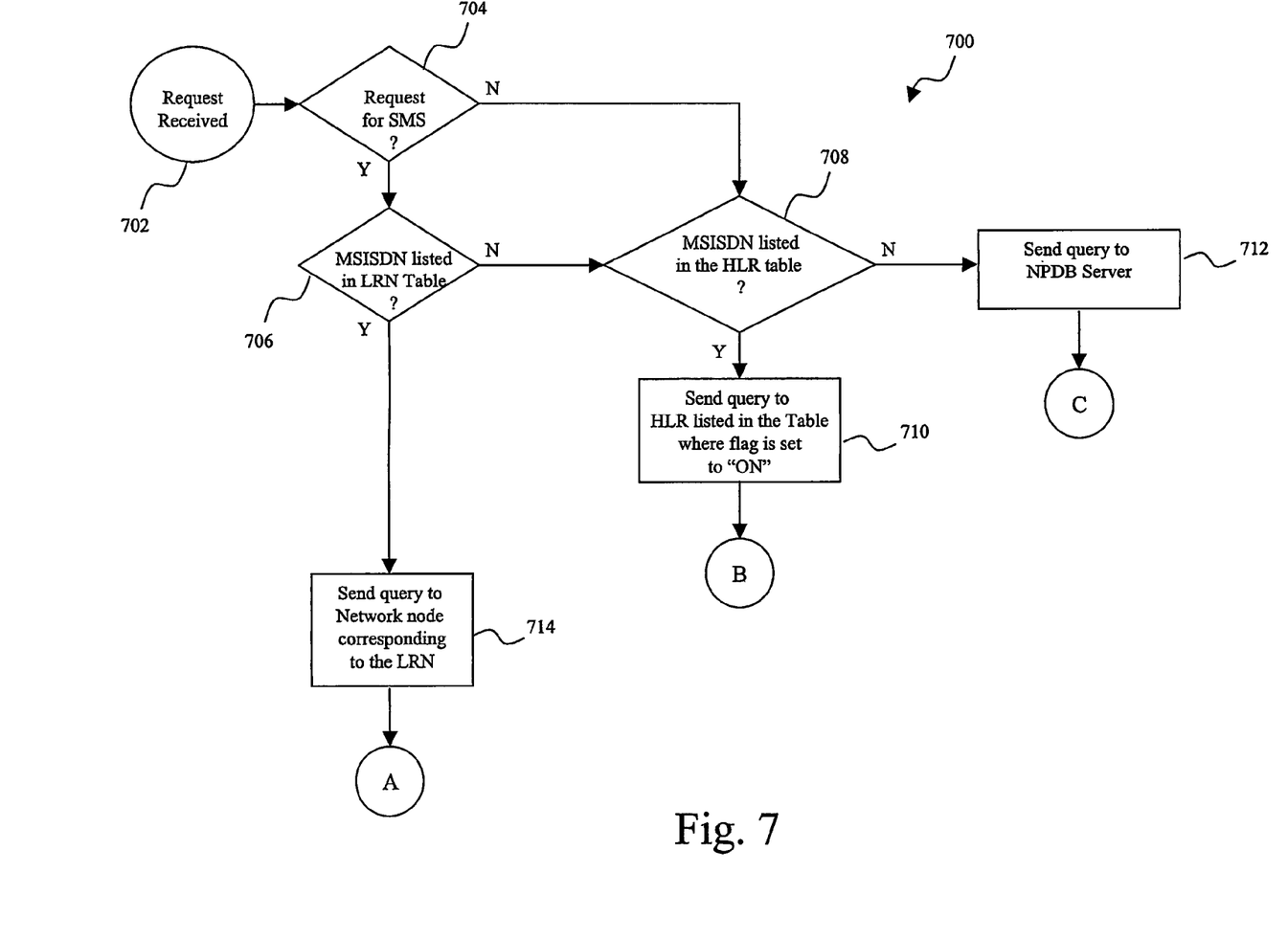
FIG. 7 is a flow chart illustrating a first portion of an exemplary method that may be executed by the NMRD during the service operation of FIG. 6.

Referring now to FIG. 6, an exemplary service operation is illustrated using the Central Node 502 of FIG. 5, where the NPDB server 504 is an independent network entity. The current operation involves a PSTN user "Party A" dialing the GSM mobile 340 that has a TDMA ported number. However, as will be described in greater detail with respect to FIGS. 7-10, between the receipt of a "LOCREQ" message by the Central Node 502 in step 2, and the sending of a "locreq" message by the Central Node 502 in step 7, a method is executed by the Central Node. The method may minimize the time spent to move to the next step in an end-to-end call setup procedure, which minimizes call setup delay, reduces service costs for NPDB queries, and reduces traffic and congestion on the network. In the present example, the MSISDN to HLR type mapping (Table 2) exists in the HLR_Table. It is understood that, if this were not the case, the Central Node would query the NPDB server 504 before querying the HLR. Accordingly, the method may save a query to the NPDB server 504.

Referring now to FIGS. 7-10, in one embodiment, an exemplary method 700 may be executed using the Central Node 502 of FIG. 5 to minimize call setup delay in networks such as the network architecture 500. The method 700 may be executed at different points in a call setup process. As described above, in the present example, the method 700 is executed between the "LOCREQ" message (step 2) and the "locreq" message (step 7).

The method 700 begins in step 702 when a "LOCREQ" message is received (e.g., step 2 of FIG. 6) by the Central Node 502. In step 704, a determination is made as to whether the received message is a request for SMS. If it is a request for SMS, the method 700 proceeds to step 706, where a determination is made as to whether the MSISDN is listed in the LRN_Table (Table 1, above). If the received message is not for SMS (step 704) or if the MSISDN is not listed in the LRN_Table (step 706), the method 700 moves to step 708, where a determination is made as to whether the MSISDN is listed in the Central Node's HLR_Table (Table 2, above). If the MSISDN is listed in the HLR_Table, a query is sent the HLR listed in the HLR_Table that has its flag set to ON in step 710. The method 700 then continues to the steps illustrated in FIG. 9, which will be described in greater detail below. If the MSISDN is not listed in the HLR_Table (step 708), a query is sent the NPDB server 504 in step 712. The method 700 then continues to the steps illustrated in FIG. 10, which will be described in greater detail below. Returning to steps 704 and 706, if the received message is for SMS and the MSISDN is listed in the LRN_Table, the method 700 continues to step 714, where a query is sent to a network node corresponding to the LRN.

Figure 8:
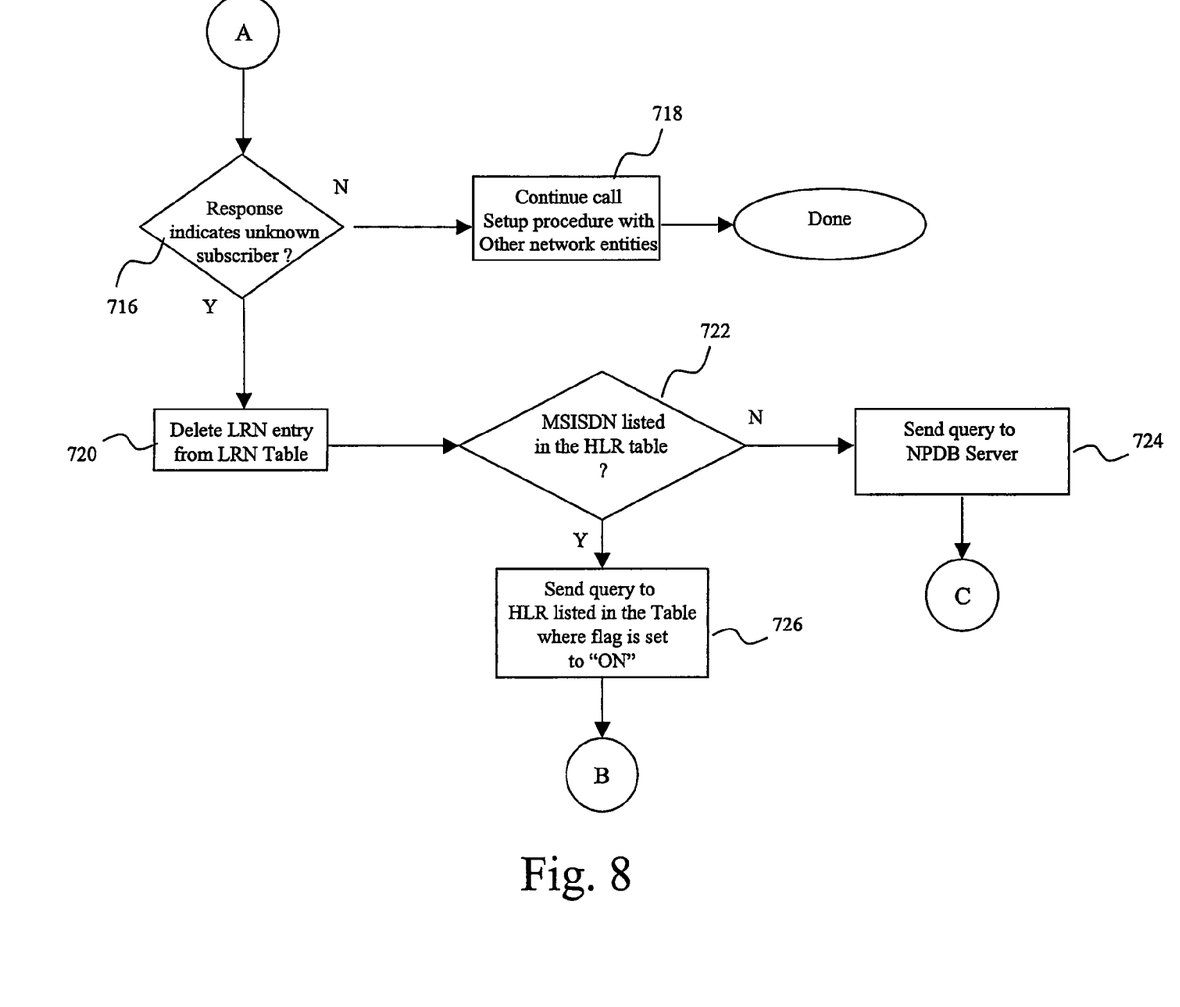
FIG. 8 is a flow chart illustrating a second portion of the method of FIG. 7.

With additional reference to FIG. 8, after the query is sent to the network node corresponding to the LRN in step 714, a determination is made in step 716 as to whether the response from the network node indicates an unknown subscriber. If the determination indicates that the subscriber is known, the method 700 continues to step 718 and proceeds with a call setup procedure. The method 700 then ends. However, if the determination indicates that the subscriber is unknown, the method 700 continues to step 720, where the LRN entry is deleted from the LRN_Table. The method 700 then continues to step 722, where a determination is made as to whether the MSISDN is listed in the HLR_Table. If the MSISDN is not listed, a query is sent the NPDB server 504 in step 724. The method 700 then continues to the steps illustrated in FIG. 10, which will be described in greater detail below. If the MSISDN is listed, a query is sent the HLR listed in the HLR_Table that has its flag set to ON in step 726.

Figure 9:
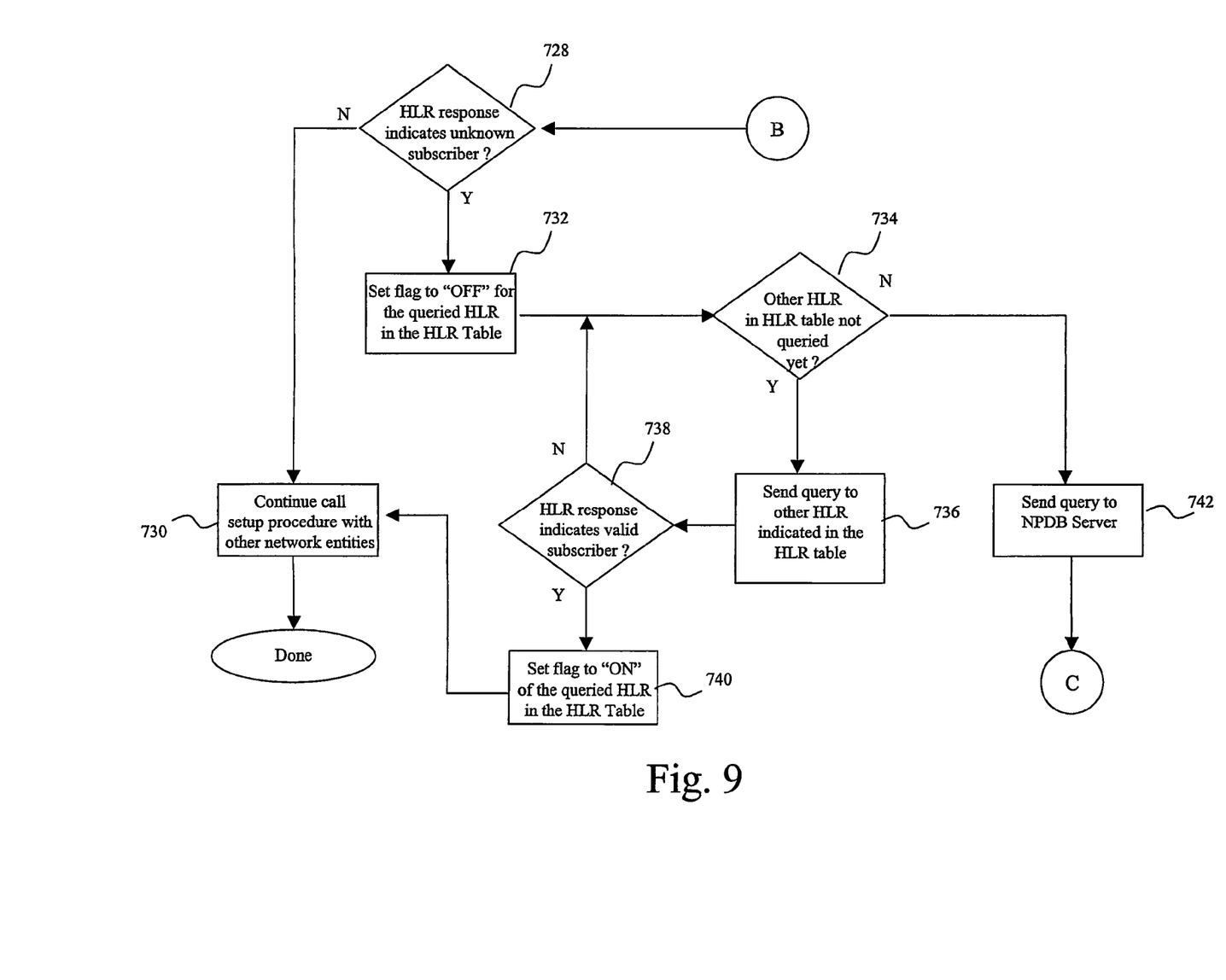
FIG. 9 is a flow chart illustrating a third portion of the method of FIG. 7.
Figure 10:
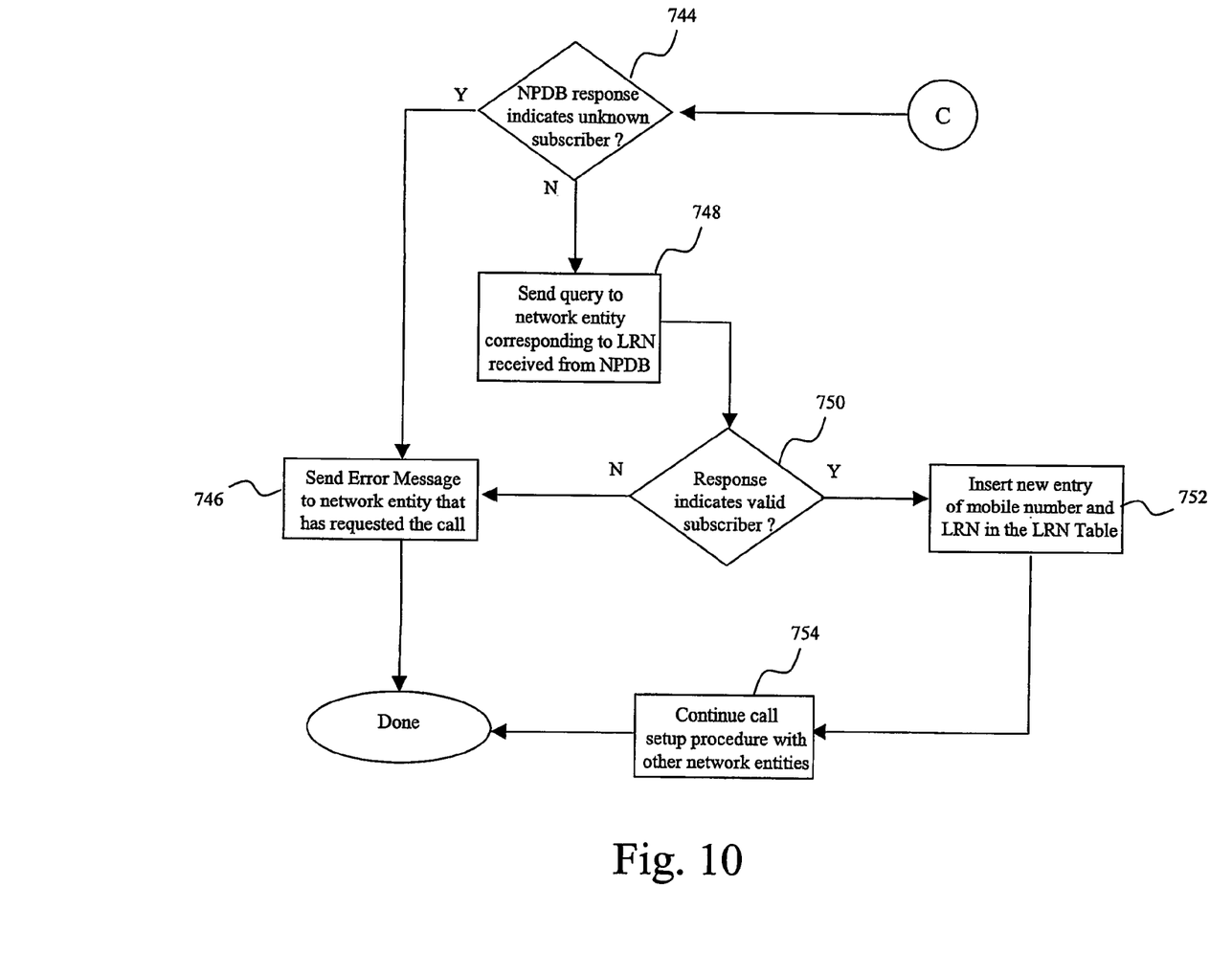
FIG. 10 is a flow chart illustrating a fourth portion of the method of FIG. 7.

With additional reference to FIG. 9, if the HLR response to the query of step 726 indicates that the subscriber is known (as determined in step 728), the method 700 continues to step 730 and proceeds with a call setup procedure. The method 700 then ends. However, if the response indicates that the subscriber is unknown, the method 700 continues to step 732, where the flag for the queried HLR is set to "OFF" in the HLR_Table. The method 700 then moves to step 734, where a determination is made as to whether other HLRs that have not yet been queried exist in the HLR_Table. If one or more HLRs have not been queried, a query is sent to another HLR listed in the HLR_Table in step 736. If the HLR response to the query of step 736 indicates that the subscriber is known (as determined in step 738), the flag associated with the HLR is set to "ON" in the HLR_Table, and the method 700 proceeds with the call setup procedure in step 730. The method 700 then ends. However, if the response indicates that the subscriber is unknown (as determined in step 738), the method 700 returns to step 734. This cycle (steps 734, 736, 740) may continue until either each listed HLR is queried or until one of the HLRs responses indicates that the subscriber is known. If the determination in step 734 indicates that all the HLRs have been queried, the method 700 continues to step 742, where a query is sent to the NPDB server 504. With additional reference to FIG. 10, a determination is made in step 744 as to whether the NPDB response to the query of step 742 indicates that the subscriber is known. If the subscriber is unknown, an error message is returned in step 746 to the network entity that has requested the call and the method 700 ends. If the subscriber is known, a query is sent to the network entity corresponding to the LRN received from the NPDB server 504 in step 748. If the response to the query indicates that the subscriber is not valid (as determined in step 750), an error message is sent in step 746. If the response indicates that the subscriber is valid, a new entry comprising the mobile number and the LRN is inserted into the LRN_Table in step 752. The method 700 then proceeds with the call setup procedure in step 754 before ending.

In comparison to the other solutions discussed earlier, the solution presented by the exemplary method and system of FIGS. 5-10 uses fewer messages and queries to the NPDB server in order for the Central Node to proceed with the call setup. This generally leads to a shorter end-to-end call setup delay. The present disclosure uses several examples. It is understood, however, that the examples are not intended to be limiting, but are used to describe exemplary embodiments of architectures and operation. For instance, although TDMA/IS41 and GSM networks are used for purposes of illustration, the disclosure may be applied to UMTS, CDMA, and other wireless networks technologies. Additionally, although two networks are used for purposes of illustration, the present disclosure may be applied to more than two networks. For instance, the disclosure may be applied to a scenario where three networks are based on three different technologies, and a mobile has a ported number from all three networks. In addition, even though voice and SMS are used for purposes of example, it is understood that the present disclosure may also be applied to other services, such as Unstructured Supplementary Service Data (USSD) services. Furthermore, although the Central Node is shown connected to one MSC, GMSC, MTX and HLR, the Central Node may be connected to multiple MSC, GMSC, MTX, and HLR entities. In addition, the present disclosure may be applied to mobiles that do not have ported numbers from another network. It is also understood that the Central Node may be implemented using software and/or hardware.

Accordingly, while the disclosure has been particularly shown and described with reference to embodiments thereof, it will be understood by those skilled in the art that various changes in form and detail may be made therein without departing from the spirit and scope of the disclosure. Therefore, it is understood that several modifications, changes and substitutions are intended in the foregoing disclosure and in some instances, some features of the disclosure may be employed without a corresponding use of other features. Accordingly, it is appropriate that the appended claims be construed broadly and in a manner consistent with the scope of the disclosure.

What is claimed is:

1. An automated method for minimizing call setup delay for a call in a plurality of communication networks having different wireless networks having different wireless technologies associated with the respective networks, wherein the plurality of communication networks includes a central node connected to a number portability database, the method comprising:
    triggering a first query to the central node for information for routing the call when a request for setting up the call is received by a switching unit, wherein a plurality of tables are available to the central node to respond to the query, if appropriate, and route the call, and wherein the central node communicates with the plurality of communication networks using a plurality of protocols;
    triggering a second query from the central node to a home location register for the routing information in order to set up the call, wherein the second query is only triggered if a location routing number is not found in a second table; and
    triggering a third query from the central node to the number portability database, wherein the number portability database contains a database containing information on each of the wireless networks having different technologies needed for a call set-up procedure, for the routing information if the second query fails to provide the routing.

2. The method of claim 1 further comprising selecting the home location register from a first table accessible to the central node, wherein the home location register is selected based on a mobile station ISDN and a state of a flag.

3. The method of claim 1 further comprising searching a second table for the location routing number before triggering the second query.

4. The method of claim 1 wherein the home location register has a number portability mapping database for mapping ported numbers, wherein each mobile phone known to the home location register is identifiable by its mobile station integrated services digital network (ISDN) number, and wherein triggering the second query includes searching number portability mapping database for a mobile station ISDN number associated with the call.

5. The method of claim 1 wherein the call is made from one wireless communication network to another.

6. An automated telecommunications system, wherein the system includes different wireless networks having different technologies associated with the respective networks, adapted for minimizing call setup delay for a call associated with a first mobile station identifier, the system comprising:
    a plurality of home location registers (HLRs);
    a central node in communication with the HLRs, wherein the central node is in communication with a number portability database wherein the number portability database contains information on each of the wireless networks having different technologies needed for a call set-up procedure, and wherein the central node communicates with different wireless networks using a plurality of protocols;
    a first table accessible to the central node, wherein the first table contains a plurality of mobile station identifiers and associated location routing numbers;
    a second table accessible to the central node, wherein the second table contains a plurality of mobile station identifiers, wherein each identifier is associated with one of the HLRs; and
    instructions adapted for execution by the central node, the instructions including:
        instructions for searching the first table for a second mobile station identifier that matches the first mobile station identifier and sending a query to a network entity identified by the associated location routing number if a match is found; and
        instructions for searching the second table for a second mobile station identifier that matches the first mobile station identifier and sending a query to the associated HLR if a match is found.

7. The telecommunications system of claim 6 further comprising a number portability database (NPDB) connected to the central node, and instructions for querying the NPDB if no match is found after searching of the first and second tables.

8. The telecommunications system of claim 6 further comprising a network switch in communication with the central node, wherein the network switch is adapted for querying the central node for routing information when the switch receives a request to set up the call.

9. The telecommunications system of claim 6 wherein at least some of the plurality of HLRs are based on different technologies.

10. The telecommunications system of claim 6 wherein the instructions further include instructions for receiving and sending messages based on different technologies.

* * * * *